(12) United States Patent
Prouff et al.

(10) Patent No.: US 10,897,345 B2
(45) Date of Patent: Jan. 19, 2021

(54) METHOD FOR ENCRYPTING OR DECRYPTING A N-TUPLE OF DATA WITH A N-TUPLE OF PREDETERMINED SECRET KEYS

(71) Applicant: IDEMIA IDENTITY & SECURITY FRANCE, Issy-les-Moulineaux (FR)

(72) Inventors: Emmanuel Prouff, Issy les Moulineaux (FR); Roch Olivier Lescuyer De Chaptal-Lamure, Issy les Moulineaux (FR); Victor Servant, Issy les Moulineaux (FR)

(73) Assignee: IDEMIA IDENTITY & SECURITY FRANCE, Illy-les-Moulineaux (FR)

( * ) Notice: Subject to any disclaimer, the term of this patent is extended or adjusted under 35 U.S.C. 154(b) by 124 days.

(21) Appl. No.: 15/866,356

(22) Filed: Jan. 9, 2018

(65) Prior Publication Data

US 2018/0198611 A1    Jul. 12, 2018

(30) Foreign Application Priority Data

Jan. 10, 2017    (FR) .................................... 17 50215

(51) Int. Cl.
*H04L 9/06* (2006.01)
*H04L 9/14* (2006.01)
(Continued)

(52) U.S. Cl.
CPC .................. *H04L 9/06* (2013.01); *H04L 9/14* (2013.01); *G06F 17/10* (2013.01); *H04L 9/08* (2013.01); *H04L 2209/16* (2013.01)

(58) Field of Classification Search
CPC ......... H04L 9/08; H04L 9/14; H04L 2209/16; H04L 9/06; G06F 17/10
See application file for complete search history.

(56) References Cited

U.S. PATENT DOCUMENTS

2010/0299515 A1    11/2010    Michiels et al.
2012/0045050 A1     2/2012    Farrugia et al.
(Continued)

FOREIGN PATENT DOCUMENTS

| EP | 2922234 A1 | 9/2015 |
| EP | 2924677 A1 | 9/2015 |
| EP | 2996278 A1 | 3/2016 |

OTHER PUBLICATIONS

Chow et al., "White-Box Cryptography and an AES implementation", SAC, pp. 1-18. (Year: 2002).*
(Continued)

*Primary Examiner* — Robert B Leung
(74) *Attorney, Agent, or Firm* — Womble Bond Dickinson (US) LLP

(57) ABSTRACT

A method for encrypting or decrypting a n-tuple of data ($\{a_i\}_{i\in[[0,n-1]]}$) with a n-tuple of secret keys ($\{k_i\}_{i\in[[0,n-1]]}$). The method uses a data-processor to perform the steps of: (a) for each element ($a_i$), determining m>n first internal states ($\{y_{ij}\}_{j\in[[0,m-1]]}$) by application of m first operations, each: represented by a table ($T_{ij}$), and defined as the combination of a single bijective internal encoding ($G_{ij}$), of a non-linear sharing function ($D_i$, $E_i$, $F_i$ . . . ), and of a given non-linear permutation function ($f$) parameterized with the secret key ($k_i$), and (b) for each n-tuple of first internal states ($\{y_{ij}\}_{i\in[[0,n-1]]}$), determining a second internal state ($z_j$) by application of a second operation: represented by a table ($T_{Lj}$), and defined as the combination of a second single bijective internal encoding ($G_{Lj}$), a linear multiplexing function (L), and the inverses of the first bijective internal encodings ($G_{ij}$).

14 Claims, 4 Drawing Sheets

(51) Int. Cl.
   *G06F 17/10* (2006.01)
   *H04L 9/08* (2006.01)

(56) References Cited

U.S. PATENT DOCUMENTS

2015/0270949 A1* 9/2015 Michiels .................. H04L 9/14
                                                          380/28
2015/0270950 A1* 9/2015 Michiels ................. H04L 9/002
                                                          380/28
2016/0330019 A1* 11/2016 Michiels ............... H04L 9/0631

OTHER PUBLICATIONS

Billet O., Gilbert H., Ech-Chatbi C. (2004) Cryptanalysis of a White Box AES Implementation. In: Handschuh H., Hasan M.A. (eds) Selected Areas in Cryptography. SAC 2004. Lecture Notes in Computer Science, vol. 3357. Springer, Berlin, Heidelberg (Year: 2004).*
(AES) Federal Information Processing Standards. Nov. 26, 2001. doi:10.6028/NIST.FIPS.197. 197. (Year: 2001).*
(DES) Federal Information Processing Standards. Oct. 25, 1999. NIST.FIPS.46-3 (Year: 1999).*
S. Dziembowski and K. Pietrzak, "Leakage-Resilient Cryptography," 2008 49th Annual IEEE Symposium on Foundations of Computer Science, Philadelphia, PA, 2008, pp. 293-302, doi: 10.1109/FOCS.2008.56. (Year: 2008).*
Rivain et al., "Provably Secure Higher-Order Masking of AES", Cryptographic Hardware and Embedded Systems, CHES 2010, 12th International Workshop, Santa Barbara, CA, USA, Aug. 17-20, 2010, 20 pages.
Preliminary Research Report received for French Application No. 1750215, dated Oct. 26, 2017, 4 pages (1 page of French Translation Cover Sheet and 3 pages of original document).
Ishai et al., "Private Circuits: Securing Hardware against Probing Attacks", Annual International Cryptology Conference, Advances in Cryptology, CRYPTO 2003, pp. 462-479.
European Search Report and Written Opinion received for EP Patent Application No. 18305016.0, dated May 8, 2018, 5 pages of Original Document Only.
Chow et al., "Selected Areas in Cryptography, White-Box Cryptography and an AES Implementation", Selected Areas in Cryptography, 9th Annual International Workshop, SAC 2002, Lecture Notes in Computer Science, vol. 2595, pp. 250-270.

* cited by examiner

METHOD FOR ENCRYPTING OR DECRYPTING A N-TUPLE OF DATA WITH A N-TUPLE OF PREDETERMINED SECRET KEYS

GENERAL TECHNICAL FIELD

The present invention relates to the field of cryptography, and in particular an encryption/decryption method of "white box" type.

PRIOR ART

A function is considered as a "black box" when there can be no access to its internal operation, i.e. its inputs and outputs can be known but not its secret parameters or its intermediate states.

Cryptographic algorithms (for example for encryption or signature) are thus conventionally supposed as black boxes when their reliability is evaluated (resistance to attacks).

For example, in the case of typical cryptographic algorithms such as DES ("Data Encryption Standard") or AES ("Advanced Encryption Standard"), these work on blocks of size 64 or 128 bits (and tomorrow 256 bits), but in a single operation cannot process such a block (there are already over $10^{19}$ possible values of blocks of 64 bits). It is necessary to work inside a block on smaller elements, typically of size 8 bits (only 256 possibilities) by chaining non-linear (bijective) operations with linear (non-injective) operations.

In reference to FIG. 1a, these algorithms can be illustrated in a highly simplified way by the formula $a_0$, $a_1 \rightarrow L$ ($f(a_0+k_0)$, $f(a_1+k_1)$), where f designates a non-linear operation, for example on 8 bits, L designates a linear function (for example a XOR, "eXclusive OR") in the example transforming two words of 8 bits of a block into one word of 8 bits, $a_0$ and $a_1$ are bytes of text to be encrypted and $k_0$ and $k_1$ are secret data (the "keys" of the algorithm). Said formula is applied iteratively to process the whole block.

The hypothesis of black box in this case supposes that the data $k_0$ and $k_1$ or the intermediate states $f(a_0+k_0)$ and $f(a_1+k_1)$ are inaccessible.

This hypothesis imposes a major restriction on the storage and handling of these parameters. But tools have recently been published to enable automation of attacks on hardware implementation, so-called side channel or fault attacks.

Today, for many cases of use including payment on mobile, it is necessary to deploy cryptographic algorithms by making as few assumptions as possible on the security of the target hardware. Secure storage and handling of secret parameters must be ensured at the application level.

The cryptography known as white box aims to respond to this challenge by proposing implementations of cryptographic algorithms which are supposed to make extraction of secrets impossible, even in case of attack allowing the attacker full access to the software implementation of the algorithm. More exactly, a function is considered as a "white box" when its mechanisms are visible and enable understanding of its operation. In other terms, the direct assumption is made that the attacker has access to everything he wants (the binary is completely visible and modifiable by the attacker who has complete control of the operation platform). Consequently, implementation itself is the sole line of defence.

To protect implantation of a pattern such as described earlier, it has first been proposed to merge keys $k_0$ and $k_1$ with the function $f$ by representing computations by tables. For the example studied, in reference to FIG. 1b, this comes down to storing in memory (e.g. ROM or Flash) three tables $T_0$, $T_1$ and $T_L$ representing respectively the functions $a_0 \rightarrow T_0$ $[a_0] = f(a_0+k_0)$, $a_1 \rightarrow T_1[a_1] = f(a_1+k_1)$ and $(y_0, y_1) \rightarrow T_L[y_0, y_1]L(y_0, y_1) = z$.

This ploy avoids having the keys in the clear, but is not enough to resist an attack consisting of exhaustively testing all possible keys $k_0$ (respectively $k_1$) to the point of finding the one which verifies $y_0 = f(a_0+k_0)$ (respectively $y_1 = f(a_1+k_1)$).

It has been proposed to "mask" the internal states which are masked by random permutations $G_0$, $G_1$, $G_2$ (unknown but constant) called internal encodings. More precisely, as shown by FIG. 1c, this produces the internal states $G_0[y_0]$ and $G_1[y_1]$, from which the keys cannot be retrieved by directly testing all possibilities. Using the linear function $G_2$ o $T_L$ o $(G_0^{-1}, G_1^{-1})$ gives $G_2$ o $T_L$ o $(G_0^{-1}$ o $G_0$ $[y_0]$, $G_1^{-1}$ o $G_1[y_1]) = G_2 \circ T_L$ $[y_0, y_1] = G_2$ $[z]$.

But attacks have shown that patterns such as above could still be attacked when the encoding was linear by exploiting the correlation between the encoded datum and the sensitive datum (i.e. $y_i$ or z in the example above), cf. the article "Differential Computation Analysis: Hiding Your White-Box Designs is Not Enough" at CHES2016.

This pattern is also sensitive to other attacks known as collision attacks which exploit the non-injective character of linear transformations (here $T_L$) to build algebraic relations giving information on the key (the pair ($k_0$, $k_1$) in the example above), cf. the article "Cryptanalysis of a White Box AES Implementation" published at SAC2004.

More precisely, couples of pairs can be found ($a_0$, $a_1$) and ($a'_0$, $a'_1$) such as $G_2 \circ T_L$ $[f(a_0+k_0), f(a_1+k_1)] = G_2 \circ T_L$ $[f(a'_0+k_0), f(a'_1+k_1)]$, i.e. $T_L$ $[f$ $(a_0+k_0), f(a_1+k_1)] = T_L$ $[f(a'_0+k_0), f(a'_1+k_1)]$ to make of the non-injective character of $T_L$. Random permutations are thus eliminated and if there are enough couples, the values of keys $k_0$, $k_1$, can again be exhaustively tested which is long though feasible.

Applications EP2924677, EP2922234 and EP2996278 have consequently proposed a breakdown of internal states into a sum of fragments "splits", so as to execute the non-linear function fragment by fragment. For this, a linear sharing function $D_i(y)$ for splitting y, is used and the random permutations at $G_{00}$, $G_{10}$, $G_{L0}$, $G_{01}$, $G_{11}$, $G_{L1}$ corresponding to one or the other of the fragments are duplicated.

However, this pattern remains sensitive to some attacks, in particular by collision: assuming the computations are simpler than $T_L$ is the eXclusive OR function, "XOR", which does not diminish the generality of the idea since any linear function can decompose into a succession of XORs and scalar products with constants, if for given z, the set $\mathcal{P}_z$ of pairs ($x_0$, $x_1$) is built such that $z = G_{L0} \circ (D_0(y_0)+D_1(y_1))$, then for each pair ($x_0$, $x_1$) $\in \mathcal{P}_z$, $D_0(y_0)+c_z = D_1(y_1)$, i.e. $y_1 = D_1^{-1}(D_0(y_0)+c_z)$ can be posed.

This builds the function $\varphi_{\hat{k}_0,\hat{k}_1}: \hat{y}_0 \rightarrow \hat{y}_1$ (where $\hat{y}_0, \hat{y}_1$ are the pairs associated with all the ($x_0$, $x_1$) $\in \mathcal{P}_z$, for any pair of keys $\hat{k}_0$, $\hat{k}_1$), whereof it can be shown that the case ($\hat{k}_0$, $\hat{k}_1$) = ($k_0$, $k_1$) is distinguishable, which goes back to the keys. In fact, in the right example, the function $\varphi_{\hat{k}_0, \hat{k}_1}$ is a linear function (or affine) whereas it is not when ($\hat{k}_0$, $\hat{k}_1$) ≠ ($k_0$, $k_1$).

As a consequence, it would be preferable to have a novel solution of "white box" encryption using standard mechanisms such as DES and AES which is completely resistant to all known attacks (by channel analysis, by collision, etc.).

PRESENTATION OF THE INVENTION

According to a first aspect, the present invention relates to a method for encrypting or decrypting a n-tuple of data with a n-tuple of predetermined secret keys, n≥2, for a given non-linear permutation function and a given linear multiplexing function, the method being characterized in that it comprises data-processing means of equipment implementing steps of:
(a) For each element of said n-tuple of data, determination of m>n first internal states by application to said element of first operations, each being:
  represented by a table stored on data-storage means of the equipment, and
  defined as the combination of a single bijective internal encoding, of a non-linear sharing function, and of the non-linear permutation function parameterized with the corresponding secret key, said non-linear sharing functions forming n collections such that the m functions of a collection share any input datum in m fragments whereof the sum is equal to the input datum;
  all of said first internal states determined for all said elements forming n-tuples of internal states;
(b) For each n-tuple of first internal states, determination of a second internal state by application to said internal states of the n-tuple of first internal states of a second operation being:
  represented by a table stored on the data-storage means of the equipment, and
  defined as the combination of a second single bijective internal encoding, of the linear multiplexing function, and of the inverses of said first bijective internal encodings.

According to other advantageous and non-limiting features:

$\forall i \in [[0, n-1]]$, $y_{i0}=T_{i0}[a_i]=G_{i0} \circ D_i \circ f(a_i+k_i)$, $y_{i1}=T_{i1}[a_i]=G_{i1} \circ E_i \circ f(a_i+k_i)$, $y_{i2}=T_{i2}[a_i]=G_{i2} \circ F_i \circ f(a_i+k_i)$, etc.;

$z_j=T_{Lj}[y_{0j}, y_{1j} \ldots ]=G_{Lj} \circ L(G_{0j}^{-1}[y_{0j}], G_{1j}^{-1}[y_{1j}] \ldots )$;

$\forall i \in [[0,n-1]]$, $\forall x, x=D_i(x)+E_i(x)+F_i(x)+\ldots$;

The method comprises a previous step (a) for random generation by data-processing means of a server connected to the equipment of m−1 non-linear sharing functions for each collection, from which the m-th non-linear sharing function is built;

step (a0) further comprises random generation of internal encodings, construction of tables, and their transmission to the equipment for storage on the storage means;

repetition of steps (a) and (b) so as to encrypt or decrypt a set of data comprising those of said n-tuple;

the method further comprises a determination step (c) of the encrypted/decrypted of said n-tuple of data by application to said second internal states of a third operation being:
  represented by a table stored on the data-storage means of the equipment, and
  defined as the sum of the inverses of said second bijective internal encodings.

$$z = T_z[\{z_j\}_{j \in [[0,m-1]]}] = \sum_{j=0}^{m-1} G_{Lj}^{-1}[z_j];$$

n=2;
said linear multiplexing function is the eXclusive OR function;
m=3;
each element of said n-tuple of data has a size of one byte or of one half-byte;

said non-linear permutation function is that of a cryptographic algorithm selected from DES and AES.

According to a second and a third aspect, the invention proposes a computer program product comprising code instructions for executing a method according to the first aspect for encrypting or decrypting a n-tuple of data with a n-tuple of predetermined secret keys; and storage means legible by computer equipment on which a computer program product comprises code instructions for executing a method according to the first aspect for encrypting or decrypting a n-tuple of data with a n-tuple of predetermined secret keys.

PRESENTATION OF THE FIGURES

Other features and advantages of the present invention will become more apparent upon reading the following description of a preferred embodiment. This description will be given in reference to the appended drawings, in which.

DETAILED DESCRIPTION

Architecture

Figure 2:
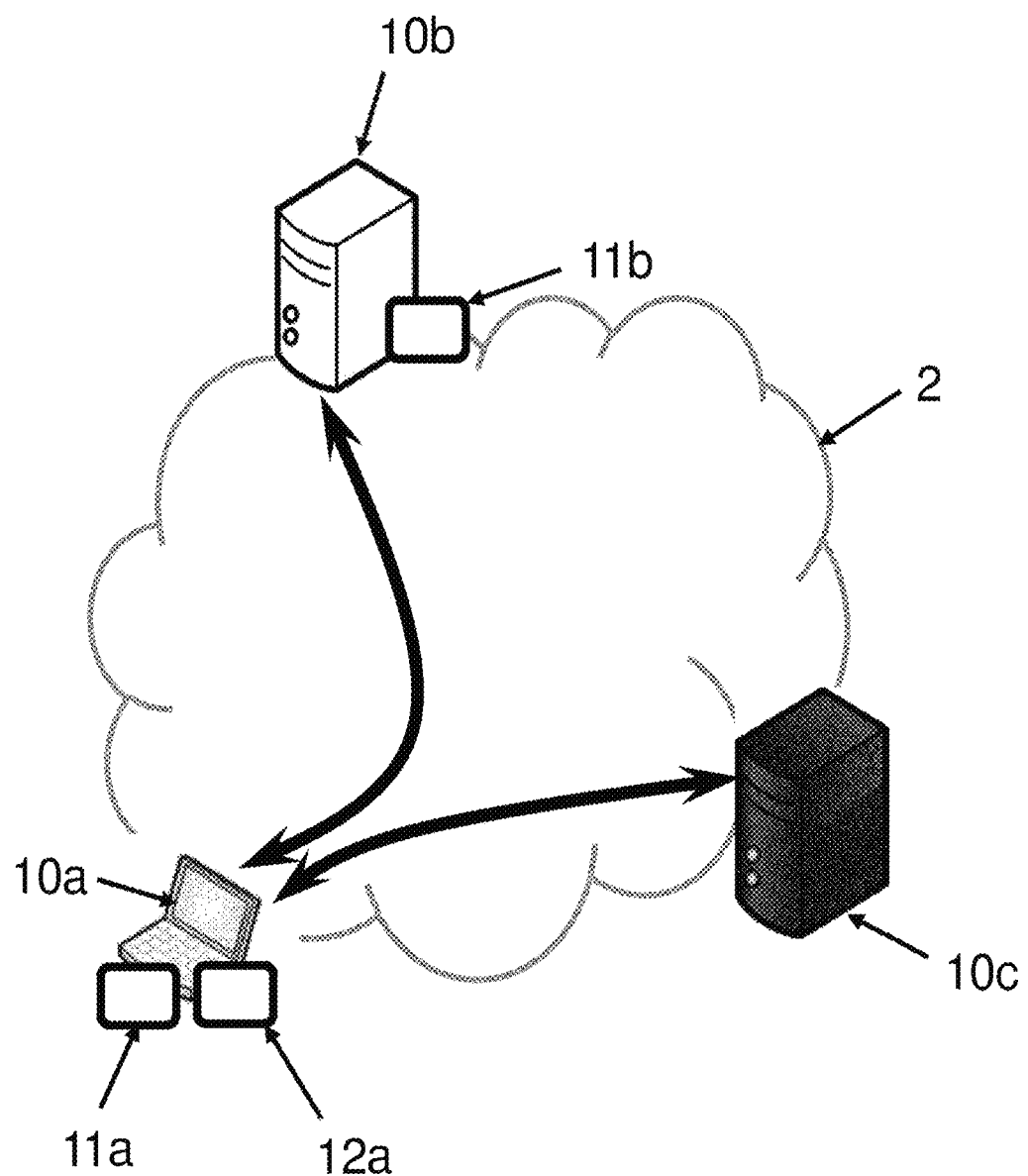
FIG. 2 is a diagram of architecture for implementing the method according to the invention.

In reference to FIG. 2, a method for "white box" encryption or decryption is proposed, implemented within equipment 10a such as a mobile terminal (smartphone, touch tablet, etc.), i.e. equipment having no particular secure hardware and which can be the object of attacks on hardware implementation, and for which the white box approach takes all interest.

The equipment 10a comprises data-processing means 11a (a processor) and data-storage means 12a (a memory, for example flash).

The equipment 10a is for example connected to a server 10b for example via the internet network 20. It can be led to receive tables (to be described later) from this server 10b (for example that of a provider of security solutions), containing secrets which will be stored in the memory 12a and used to implement the present method.

The equipment 10a can in turn be connected to other third-party servers 10c with whom it could exchange data encrypted by means of the present method.

Cryptographic Method

The present method is a cryptographic "encryption or decryption" method, meaning that according to the case it encrypts data or decrypts them. It is of symmetrical or "secret key" type.

It is understood that the present method is a novel implementation of known algorithms such as DES or AES which are the current standards. More precisely, it is not a novel encryption strategy but only a new way of handling data within the algorithm which is resistant to all "white box" hardware attacks.

According to a classic pattern, it processes data block by block, and within a block, it manipulates elements of smaller size, for example 16 elements of one byte for 128 bits block (such as AES for example). These elements are manipulated n by n, with n≥2, and advantageously n=2.

So, the present method encrypts or decrypts a n-tuple of data $\{a_i\}_{i \in [[0,n-1]]}$ with a n-tuple of predetermined secret keys $\{k_i\}_{i \in [[0,n-1]]}$. In the rest of the description, it will be assumed that n=2 (i.e. there is a pair of elements $a_0$, $a_1$ and a pair of keys $k_0$, $k_1$), but the skilled person can transpose the method to other higher values of n.

Each element $a_i$ of said n-tuple of data $\{a_i\}_{i \in [[0,n-1]]}$ has a value in a space $\{0;1\}^k$ to be noted $\mathbb{F}_2^k$ and advantageously has a size of one byte (a "byte" of 8 bits, i.e. k=8), but a size of one half-byte (a "nibble" of 4 bits, i.e. k=4) or even 6 bits could be taken for example. The preferred example of one byte will be taken in the rest of the description.

To process a complete block from smaller elements, it is necessary to multiply the operations within the block, and for this the present method classically combines the use of a non-linear permutation function $f$ (step (a) as will be seen), and the use of a linear multiplexing function L (step (b) as will be seen), each datum as a function of the cryptographic algorithm to be implemented.

The permutation function $f$ is a bijective function parameterized with a secret key $k_i$ which takes as input an input element of $\mathbb{F}_2^k$ and generates at output an output element of the same size (i.e. of $\mathbb{F}_2^k$). These functions are well known and that of any cryptographic algorithm could be used in particular using permutations, in particular an algorithm selected from DES and AES (the function $f$ is then for example a box S).

"Multiplexing" function means a function taking as input several elements of $\mathbb{F}_2^k$ (in particular n) and generating at output a single element of $\mathbb{F}_2^k$. Thus, the multiplexing function combines several elements of $\mathbb{F}_2^k$. These functions are well known and the commonly used eXclusive OR function could be used in particular (in particular in AES), noted XOR and more simply +.

It is understood that $f$ is non-linear and that L is linear.

The algorithm typically comprises alternating a stage of use of $f$ to permutate elements, then a stage of use of L for merging data, until the whole block has been processed (merged data are again permutated, then merged with other data, etc.). It is understood that the present method advantageously comprises the repetition of steps (a) and (b) so as to encrypt or decrypt a set of data comprising those of said n-tuple $\{a_i\}_{i \in [[0,n-1]]}$.

Figure 1A:
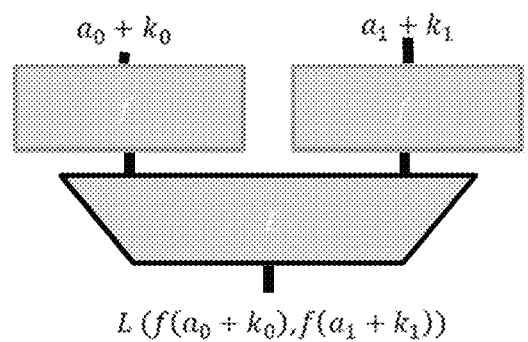
FIGS. 1a-1c illustrate three known cryptographic algorithms.
Figure 1B:
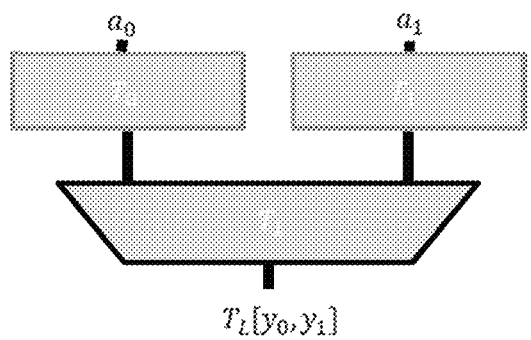
Figure 1C:
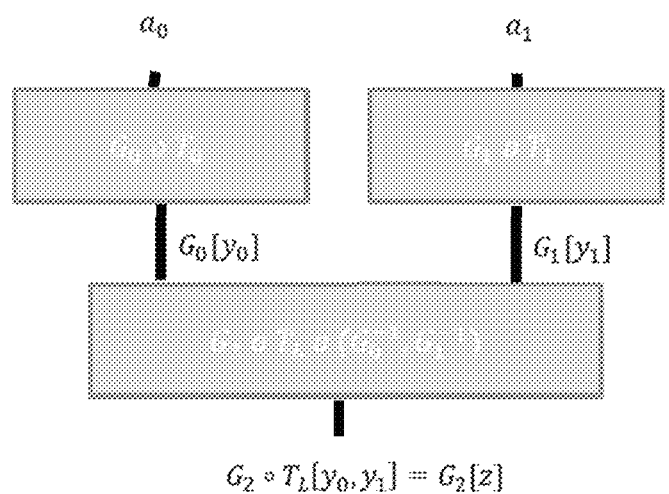

In the rest of the present description, the illustrative example of the general pattern $a_0, a_1 \rightarrow z = L(f(a_0+k_0), f(a_1+k_1))$ as found in FIGS. 1a to 1c will be taken, but the skilled person will be able to transpose it to other algorithmic structures.

It should be noted that for computations more complex than those described in the present examples, it can be interesting to use decomposition in the form of sequences of linear operations and multiplications. In this case, ideas continue to apply in combination with the works of Rivain-Prouff ("Provably Secure Higher-Order Masking of AES" CHES 2010) and Ishai-Sahai-Wagner ("Private Circuits: Securing Hardware against Probing Attacks" at CRYPTO 2003).

Permutation Step

The present method is implemented by the data-processing means 11a of the equipment 10a.

Figure 3:
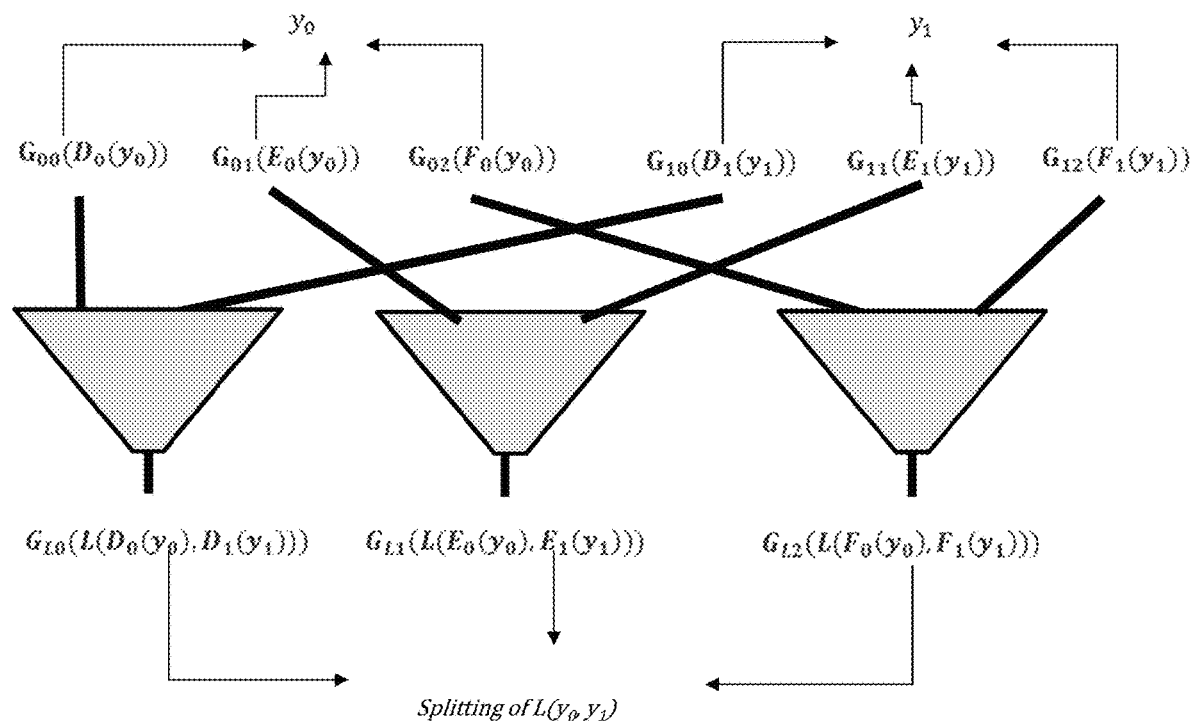
FIG. 3 illustrates an embodiment of a cryptographic algorithm in accordance with the method of the invention.

To counter attacks of the prior art, the present method proposes as shown in FIG. 3 sharing of all the internal states of the computation in at least m>n parts (in particular n+1 parts), that is, at least 3 parts if n=2 (the preferred example of 3 parts in the present description will be taken), and operating computations on these parts independently so as to find sharing of the final result ultimately expected of the computations, with non-linear sharing functions. Therefore, and as will be seen later, even though the prior art can dissuade use of sharing functions, the Applicant has discovered that the fact of using them sufficiently and selecting them non-linear astutely resolves all flaws.

As explained, the first step (a) is called permutation, and will use the function $f$ but not the function L.

In this step (a), for each element $a_i$ of said n-tuple of data $\{a_i\}_{i \in [[0,n-1]]}$ (i.e. $\forall i \in [[0, n-1]]$), "first internal states" $\{y_{ij}\}_{j \in [[0,m-1]]}$ are determined (belonging as elements $a_i$ to $\mathbb{F}_2^k$, and to the number of m) by application to said element $a_i$ of m "first operations". The first internal states are visible in the hypothesis of white box and must therefore be unusable for obtaining information on the secret keys.

Each first operation for this is:
  represented by a table $T_{ij}$ stored on data-storage means 12a of the equipment 10a (so as to protect implantation of the pattern and hide the keys), and
  defined as the combination of a single bijective internal encoding $G_{ij}$, of a non-linear sharing function $D_i$, $E_i$, $F_i$ ..., and of the non-linear permutation function $f$ parameterized with the corresponding secret key $k_i$, said non-linear sharing functions $D_i$, $E_i$, $F_i$ ... forming n collections $\{(D_i, E_i, F_i \ldots)\}_{i \in [[0,n-1]]}$ such that the m functions of a collection share any input datum in m fragments whereof the sum is equal to the input datum.

Therefore, typically there is:

$y_{i0} = T_{i0}[a_i] = G_{i0} \circ D_i \circ f(a_i+k_i) = G_{i0} \circ D_i(y_i)$, $y_{i1} = T_{i1}[a_i] = G_{i1} \circ E_i \circ f(a_i+k_i) = G_{i1} \circ E_i(y_i)$, $y_{i2} = T_{i2}[a_i] = G_{i2} \circ F_i \circ f(a_i+k_i) = G_{i2} \circ F_i(y_i)$, etc.

More precisely, the idea of non-linear sharing is to build functions $D_i$, $E_i$, $F_i$ ... such as $\forall i \in [[0, n-1]]$, $\forall x, x = D_i(x) + E_i(x) + F_i(x) + \ldots$. It is assumed that m=3, that is, three families $D_i$, $E_i$, $F_i$ suffice, and therefore 6 functions if n=2. The $G_{ij}$ serve as internal encoding while the $D_i$, $E_i$ and $F_i$ serve to share a secret.

Therefore, each "non-masked" internal value $y_i = f(a_i+k_i)$, which is a sensitive datum, can be rebuilt only from $D_i(y_i)$, $E_i(y_i)$ and $F_i(y_i)$.

$E_i$ and $F_i$ can be selected randomly from all functions (not just bijective) operating on elements of preferred size, in particular bytes, but not $D_i$, which is linked to the others.

The method preferably comprises a previous step (a0) of random generation by the data-processing means 11b of a server 10b connected to the equipment 10a of m−1 non-linear sharing functions $E_i$, $F_i$ ... for each collection ($D_i$, $E_i$, $F_i$ ...), from which the m-th non-linear sharing function $D_i$ is built (by posing for example $D_i(y) = y_i + E_i(y) + F_i(y) + \ldots$ for any element y).

As explained, all $G_{ij}$ are bijective masking encodings (of $\mathbb{F}_2^k$ in $\mathbb{F}_2^k$), selected randomly once for all, in particular by the server 10b.

In this way and as preferred, step (a0) further comprises random generation of internal encodings $G_{ij}$ (and as will be seen $G_{Lj}$), construction of tables $T_{ij}$, and as will be seen $T_{Lj}$), and their transmission to the equipment 10a for storage on the storage means 12a. In the preferred embodiment there are m×n first internal encodings $G_{ij}$ and their inverses, and m second internal encodings $G_{Lj}$ and their inverses. In total, (m−1)+(m×n)+m=(n+2)m−1 functions of $\mathbb{F}_2^k$ in $\mathbb{F}_2^k$ must be generated randomly.

On completion of step (a) (when it has been implemented n times for all $a_i$), there is a set (in this case m×n) of said first internal states $y_{ij}$. So m n-tuples can be formed from first internal states $\{\{y_{ij}\}_{i \in [[0,n-1]]}\}_{j \in [[0,m-1]]}$.

Multiplexing Step

The second step (b) is called multiplexing, and uses the function L to combine the first internal states $y_{ij}$.

In this step (b), for each n-tuple of first internal states $\{y_{ij}\}_{i \in [[0,n-1]]}$ (i.e. $\forall j \in [[0,m-1]]$) a (single) "second internal state" $z_j$ is determined (still in $\mathbb{F}_2^k$) by application to said internal states $y_{ij}$ of the n-tuple of first internal states $\{y_{ij}\}_{i \in [[0,n-1]]}$ of a "second operation".

As before, the second internal states are visible in the hypothesis of white box and therefore must be unusable for obtaining information on the first internal states and the secret keys.

Each second operation for this is:
- represented by a table $T_{Lj}$ stored on the data-storage means 12a of the equipment 10a (again so as to protect implantation of the pattern), and
- defined as the combination of a second single bijective internal encoding $G_{Lj}$, of the linear multiplexing function L, and of the inverses of said first bijective internal encodings $G_{ij}$.

Therefore, this typically gives: $z_j = T_{Lj}[y_{0j}, y_{1j} \ldots] = G_{Lj} \circ L(G_{0j}^{-1}[y_{0j}], G_{1j}^{-1}[y_{1j}] \ldots )$.

n by n will be cross-combined as evident in FIG. 3, the first internal states such that the non-masked value of $z = T_L[y_0, y_1, \ldots]$ which is another sensitive datum can again be rebuilt from all the $D_i(y_i)$, $E_i(y_i)$ and $F_i(y_i)$. The $G_{Lj}$ again serve as internal encoding while the $D_i$, $E_i$ and $F_i$ serve to share a secret.

Explanation

The encrypted/decrypted z of said n-tuple of data $\{a_i\}_{i \in [[0,n-1]]}$ can easily be retrieved from m second internal states $\{z_j\}_{j \in [[0,m-1]]}$.

If needed, it is sufficient to apply to them in a step (c) a "third operation" which is:
- represented by a table $T_z$ stored on the data-storage means 12a of the equipment 10a, and
- defined as the sum of the inverses of said second bijective internal encodings $G_{Lj}$.

Therefore, this typically gives:

$$z = T_z[\{z_j\}_{j \in [[0,m-1]]}] = \sum_{j=0}^{m-1} G_{Lj}^{-1}[z_j].$$

Yet, because n<m, each $z_j$ contains insufficient information for rebuilding to obtain a relation linking the $y_i$, an attack by collision therefore becomes impossible.

To illustrate this in the case n=2 and m=3, for any pair of octets (a, b), there is $\forall j \in \{0; 1; 2\}$, $T_{Lj}(a, b) = G_{Lj}(L(G_{0j}^{-1}(a), G_{1j}^{-1}(b)))$, that is, $T_{L0}(a, b) = G_{L0}(L(G_{00}^{-1}(a), G_{10}^{-1}(b)))$, $T_{L1}(a, b) = G_{L1}(L(G_{01}^{-1}(a), G_{11}^{-1}(b)))$ and $T_{L2}(a, b) = G_{L2}(L(G_{02}^{-1}(a), G_{12}^{-1}(b)))$.

It can be verified that by linearity of L and by construction, there is $T_{L0}(T_{00}[a_0], T_{10}[a_1]) = G_{L0}(L(G_{00}^{-1}(G_{00} \circ D_0[y_0]), G_{10}^{-1}(G_{10} \circ D_1[y_1]))) = G_{L0}(L(D_0[y_0], D_1[y_1]))$;

$T_{L1}(T_{01}[a_0], T_{11}[a_1]) = G_{L1}(L(G_{01}^{-1}(G_{01} \circ E_0[y_0]), G_{11}^{-1}(G_{11} \circ E_1[y_1]))) = G_{L1}(L(E_0[y_0], E_1[y_1]))$;

$T_{L2}(T_{02}[a_0], T_{12}[a_1]) = G_{L2}(L(G_{02}^{-1}(G_{02} \circ F_0[y_0]), G_{12}^{-1}(G_{12} \circ F_1[y_1]))) = G_{L2}(L(F_0[y_0], F_1[y_1]))$;

That is $\forall j \in \{0; 1; 2\}$, $T_{Lj}(T_{0j}[a_0], T_{1j}[a_1]) = G_{Lj}(L(G_{0j}^{-1}[y_{0j}], G_{1j}^{-1}[y_{1j}]))$. This suggests that the $G_{Lj}$ for j=0,1,2 form encoding of a share of the datum $T_L[y_0, y_1]$ described in FIG. 1c.

And $z = G_{L0}^{-1}[z_0] + G_{L1}^{-1}[z_1] + G_{L2}^{-1}[z_2] = G_{L0}^{-1} \circ G_{L0}(L(D_0[y_0], D_1[y_1])) + G_{L1}^{-1} \circ G_{L1}(L(E_0[y_0], E_1[y_1])) + G_{L2}^{-1} \circ$ $G_{L2}(L(F_0[y_0], F_1[y_1])) = L(D_0[a_0], D_1[a_1]) + L(E_0[y_0], E_1[y_1]) + L(F_0[y_0], F_1[y_1]) = L(D_0[y_0] + E_0[y_0] + F_0[y_0], D_1[y_1] + E_1[y_1] + F_1[y_1]) = L(y_0, y_1) = L(f(x_0 + k_0), f(y_0 + k_1))$.

The present breakdown therefore easily achieves its objective, specifically enabling encryption or decryption of elements and obtaining only internal states which cannot be exploited to recover the secret keys.

Computer Program Product

According to a second and a third aspects, the invention relates to a computer program product comprising code instructions for executing (in particular on the data-processing means 11a of the equipment 10a) a method according to the first aspect of the invention for encrypting or decrypting a n-tuple of data $\{a_i\}_{i \in [[0,n-1]]}$ with a n-tuple of predetermined secret keys $\{k_i\}_{i \in [[0,n-1]]}$, as well as storage means legible by computer equipment (a memory 12a of the equipment 10a) hosting this computer program product.

The invention claimed is:

1. A method for encrypting or decrypting a n-tuple of data ($\{a_i\}_{i \in [[0,n-1]]}$) with a n-tuple of predetermined secret keys ($\{k_i\}_{i \in [[0,n-1]]}$), n≥2, for a given non-linear permutation function ($f$) and a given linear multiplexing function (L), the method being characterized in that it comprises a data processor (11a) of equipment (10a) implementing steps of:
  (a) For each element ($a_i$) of said n-tuple of data ($\{a_i\}_{i \in [[0,n-1]]}$), determination of m>n first internal states ($\{y_{ij}\}_{j \in [[0,m-1]]}$) by application to said element ($a_i$) of m first operations, each being:
    represented by a table ($T_{ij}$) stored on a memory (12a) of the equipment (10a), and
    defined as the combination of a single bijective internal encoding ($G_{ij}$), of a non-linear sharing function ($D_i$, $E_i$, $F_i$ ...), and of the non-linear permutation function ($f$) parameterized with the corresponding secret key ($k_i$), said non-linear sharing functions ($D_i$, $E_i$, $F_i$ ...) forming n collections ($\{(D_i, E_i, F_i \ldots)\}_{i \in [[0,n-1]]}$) such that the m functions of a collection share any input datum in m fragments whereof the sum is equal to the input datum, with $\forall i \in [[0, n-1]]$, $\forall x$, $x = D_i(x) + E_i(x) + F_i(x) + \ldots$;
  all of said first internal states $y_{ij}$; determined for all said elements ($a_i$) forming m n-tuples of internal states ($\{\{y_{ij}\}_{i \in [[0,n-1]]}\}_{j \in [[0,m-1]]}$);
  (b) For each n-tuple of first internal states ($\{y_{ij}\}_{i \in [[0,n-1]]}$), determination of a second internal state ($z_j$) by application to said internal states ($y_{ij}$) of the n-tuple of first internal states ($\{y_{ij}\}_{i \in [[0,n-1]]}$) of a second operation being:
    represented by a table ($T_{Lj}$) stored on the memory (12a) of the equipment (10a), and
    defined as the combination of a second single bijective internal encoding ($G_{Lj}$), of the linear multiplexing function (L), and of the inverses of said first bijective internal encodings ($G_{ij}$).

2. The method according to claim 1, wherein $\forall i \in [[0, n-1]]$, $y_{i0} = T_{i0}[a_i] = G_{i0} \circ D_i \circ f(a_i + k_i)$, $y_{i1} = T_{i1}[a_i] = G_{i1} \circ E_i \circ f(a_i + k_i)$, $y_{i2} = T_{i2}[a_i] = G_{i2} \circ F_i \circ f(a_i + k_i)$, etc.

3. The method according to claim 2, wherein $z_j = T_{Lj}[y_{0j}, y_{1j} \ldots] = G_{Lj} \circ L(G_{0j}^{-1}[y_{0j}], G_{1j}^{-1}[y_{1j}] \ldots )$.

4. The method according to claim 1, comprising prior to said step (a) random generation by a data processor (11b) of a server (10b) connected to the equipment (1a) of m−1 non-linear sharing functions ($E_i$, $F_i$ ...) for each collection ($D_i$, $E_i$, $F_i$ ...), from which the m-th non-linear sharing function ($D_i$) is built.

5. The method according to claim 4, wherein said random generation further comprises random generation of internal encodings ($G_{ij}$, $G_{Lj}$), construction of tables ($T_{ij}$, $T_{Lj}$), and their transmission to the equipment (10a) for storage on the memory (12a).

6. The method according to claim 1, comprising the repetition of said steps (a) and (b) so as to encrypt or decrypt a set of data comprising those of said n-tuple ($\{a_i\}_{i\in[[0,n-1]]}$).

7. The method according to claim 1, further comprising a determination step (c) of the encrypted/decrypted (z) of said n-tuple of data ($\{a_i\}_{i\in[[0,n-1]]}$) by application to said second internal states ($\{z_j\}_{j\in[[0,m-1]]}$) of a third operation being:
   represented by a table ($T_z$) stored on the storage (12a) of the equipment (10a), and
   defined as the sum of the inverses of said second bijective internal encodings ($G_{Lj}$).

8. The method according to claim 7, wherein $$z = T_z[\{z_j\}_{j\in[[0,m-1]]}] = \sum_{j=0}^{m-1} G_{Lj}^{-1}[z_j].$$

9. The method according to claim 1, wherein n=2.

10. The method according to claim 9, wherein said linear multiplexing function (L) is the eXclusive OR function.

11. The method according to claim 1, wherein m=3.

12. The method according to claim 1, wherein each element ($a_i$) of said n-tuple of data ($\{a_i\}_{i\in[[0,n-1]]}$) has a size of one byte or of one half-byte.

13. The method according to claim 1, wherein said non-linear permutation function ($f$) is that of a cryptographic algorithm selected from DES and AES.

14. A non-transitory computer readable medium on which is stored a computer program product including code instructions for executing a method for encryption or decryption of a n-tuple of data ($\{a_i\}_{i\in[[0,n-1]]}$) with a n-tuple of predetermined secret keys ($\{k_i\}_{i\in[[0,n-1]]}$) comprising:
   (a) For each element ($a_i$) of said n-tuple of data ($\{a_i\}_{i\in[[0,n-1]]}$), determination of m>n first internal states ($\{y_{ij}\}_{j\in[[0,m-1]]}$) by application to said element ($a_i$) of m first operations, each being:
      represented by a table ($T_{ij}$) stored on a memory (12a) of the equipment (10a), and
      defined as the combination of a single bijective internal encoding ($G_{ij}$), of a non-linear sharing function ($D_i$, $E_i$, $F_i$ . . . ), and of the non-linear permutation function ($f$) parameterized with the corresponding secret key ($k_i$), said non-linear sharing functions (D_i, E_i, F_i . . . ) forming n collections ($\{$(D_i, E_i, F_i . . . )$\}$_(i $\in$[[0, n-1]])) such that the m functions of a collection share any input datum in m fragments whereof the sum is equal to the input datum, with $\forall$i $\in$[[0, n-1]], $\forall$x, x=$D_i$(x)+$E_i$(x)+$F_i$(x)+ . . . ;
   all of said first internal states $y_{ij}$ determined for all said elements ($a_i$) forming m n-tuples of internal states ($\{\{y_{ij}\}_{i\in[[0,n-1]]}\}_{j\in[[0,m-1]]}$);
   (b) For each n-tuple of first internal states ($\{y_{ij}\}_{i\in[[0,n-1]]}$), determination of a second internal state ($z_j$) by application to said internal states ($y_{ij}$) of the n-tuple of first internal states ($\{y_{ij}\}_{i\in[[0,n-1]]}$) of a second operation being:
      represented by a table ($T_{Lj}$) stored on the memory (12a) of the equipment (10a), and
      defined as the combination of a second single bijective internal encoding ($G_{Lj}$), of the linear multiplexing function (L), and of the inverses of said first bijective internal encodings ($G_{ij}$).

* * * * *